(12) United States Patent
Hirose (10) Patent No.: US 12,386,331 B2
(45) Date of Patent: Aug. 12, 2025

(54) CONTROL DEVICE FOR PERFORMING TEST OF SAFETY SIGNAL CIRCUIT, AND CONTROL METHOD FOR PERFORMING TEST OF SAFETY SIGNAL CIRCUIT

(71) Applicant: FANUC CORPORATION, Yamanashi (JP)

(72) Inventor: Noboru Hirose, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 412 days.

(21) Appl. No.: 17/801,578

(22) PCT Filed: Mar. 8, 2021

(86) PCT No.: PCT/JP2021/008960
§ 371 (c)(1),
(2) Date: Aug. 23, 2022

(87) PCT Pub. No.: WO2021/182386
PCT Pub. Date: Sep. 16, 2021

(65) Prior Publication Data
US 2023/0101050 A1 Mar. 30, 2023

(30) Foreign Application Priority Data
Mar. 13, 2020 (JP) ................................. 2020-044157

(51) Int. Cl.
*G05B 19/05* (2006.01)
(52) U.S. Cl.
CPC .. *G05B 19/058* (2013.01); *G05B 2219/14006* (2013.01)
(58) Field of Classification Search
CPC ...... G05B 9/02; G05B 19/058; G05B 19/406; G05B 2219/14006; G05B 2219/50198
See application file for complete search history.

(56) References Cited

U.S. PATENT DOCUMENTS 6,734,581 B1 * 5/2004 Griffis .................. H01H 47/002
192/129 R
7,208,899 B2 * 4/2007 Hashimoto .......... G05B 19/406
307/115

(Continued)

FOREIGN PATENT DOCUMENTS

JP  2001-14015    1/2001
JP  2010-177910   8/2010

(Continued)

OTHER PUBLICATIONS

International Search Report dated May 25, 2021 in corresponding International Application No. PCT/JP2021/008960.

*Primary Examiner* — M. N. Von Buhr
(74) *Attorney, Agent, or Firm* — Wenderoth, Lind & Ponack, L.L.P.

(57) ABSTRACT

A control device has first and second control units. The first unit includes a timing unit which measures elapsed time and instructs the start of a first safety signal circuit test based on the time, and a first circuit test control unit which, when a safety signal circuit output signal has been output to a first circuit, or output thereof has stopped, detects whether a safety signal circuit input signal is input, and executes the first safety signal circuit test. The second unit is provided with an implementation verifying unit which verifies whether the first safety signal circuit test is complete, and a second circuit test control unit which, after verification, when a safety signal circuit output signal is output to a second circuit, or when output thereof has stopped, detects whether a safety signal circuit input signal is input, and executes a second safety signal circuit test.

4 Claims, 6 Drawing Sheets

(56) References Cited

U.S. PATENT DOCUMENTS

| | | | | |
|---|---|---|---|---|
| 7,656,629 | B2* | 2/2010 | Pullmann | H01H 47/002 |
| | | | | 361/62 |
| 9,852,852 | B2* | 12/2017 | Le | H01H 47/004 |
| 9,933,771 | B2* | 4/2018 | Hoshino | G05B 9/02 |
| 10,373,776 | B2* | 8/2019 | Kurokawa | G05B 19/414 |
| 10,937,611 | B2* | 3/2021 | Papenbreer | H01H 9/54 |
| 2003/0053272 | A1* | 3/2003 | Hetzer | G05B 9/02 |
| | | | | 361/1 |
| 2006/0214618 | A1 | 9/2006 | Hashimoto et al. | |
| 2015/0295524 | A1* | 10/2015 | Kangas | H02P 29/02 |
| | | | | 318/452 |
| 2016/0363924 | A1 | 12/2016 | Tanaka | |
| 2018/0309378 | A1* | 10/2018 | Hanada | H02P 25/062 |
| 2023/0278216 | A1* | 9/2023 | Itagaki | B25J 9/1666 |
| | | | | 700/255 |

FOREIGN PATENT DOCUMENTS

| | | |
|---|---|---|
| JP | 6344500 | 6/2018 |
| WO | 2018/155426 A1 | 8/2018 |

* cited by examiner

CONTROL DEVICE FOR PERFORMING TEST OF SAFETY SIGNAL CIRCUIT, AND CONTROL METHOD FOR PERFORMING TEST OF SAFETY SIGNAL CIRCUIT

TECHNICAL FIELD

The present invention relates to a control device and a control method.

BACKGROUND ART

Conventionally, in some automatic control devices, a test for ensuring a safety function, such as a safety signal circuit test or an MCC (Electromagnetic Contactor) test, is periodically performed.

In this regard, a safety control method is known in which an A system and a B system mutually monitor each other for normal operation via dual port memory (DPM) provided for data exchange between the A system and the B system when both the A and B systems are used to duplicate input/output for the purpose of safety (see, for example, Patent Document 1).

Patent Document 1: Japanese Unexamined Patent Application, Publication No. 2001-014015

DISCLOSURE OF THE INVENTION

Problems to be Solved by the Invention

Machine tools, in particular, require a high level of safety, and therefore emergency stop signals, for example, are controlled using multiplexed safety signals as described above. Always-on or always-off signals, even if multiplexed, need to be tested periodically to check their proper changeability, because the signals can compromise safety if stuck in the same state.

In such a test, a plurality of signals need to be changed in turn, because a short between the signals cannot be detected if the plurality of signals are changed simultaneously.

In this test, each of the signals is controlled using a program that runs on a different CPU, and therefore it is necessary to create a program that allows for coordination between the CPUs. However, it is very costly to create such a coordination program.

It is therefore desired to facilitate creation of a safety signal test program by preliminarily providing a function for coordination between CPUs.

Means for Solving the Problems

An aspect of the present disclosure is directed to a control device for performing a test of a safety signal circuit that cuts off, based on an input signal, a motor drive signal for driving a motor included in a machine tool. The control device includes: the safety signal circuit; a first controller; and a second controller. The first controller includes: a timing unit configured to measure an elapsed time and direct a start of a first safety signal circuit test based on the elapsed time; and a first circuit test control unit configured to detect whether or not a safety signal circuit input signal is inputted when a safety signal circuit output signal is outputted to a first circuit or the safety signal circuit output signal being outputted to the first circuit is stopped, and perform the first safety signal circuit test using a result of this detection. The second controller includes: an execution confirmation unit configured to confirm whether or not the first safety signal circuit test by the first test control unit is complete; and a second circuit test control unit configured to detect, after the execution confirmation unit has confirmed that the first safety signal circuit test is complete, whether or not a safety signal circuit input signal is inputted when a safety signal circuit output signal is outputted to a second circuit or the safety signal circuit output signal being outputted to the second circuit is stopped, and perform a second safety signal circuit test using a result of this detection. Another aspect of the present disclosure is directed to a control method for performing, in a control device, a test of a safety signal circuit that cuts off, based on an input signal, a motor drive signal for driving a motor included in a machine tool. The control device includes: the safety signal circuit; a first controller; and a second controller. The control method includes: a timing step in which the first controller measures an elapsed time and directs a start of a first safety signal circuit test based on the elapsed time; a first circuit test control step in which the first controller detects whether or not a safety signal circuit input signal is inputted when a safety signal circuit output signal is outputted to a first circuit or the safety signal circuit output signal being outputted to the first circuit is stopped, and performs the first safety signal circuit test using a result of this detection; an execution confirmation step in which the second controller confirms whether or not the first safety signal circuit test in the first circuit test control step is complete; and a second circuit test control step in which the second controller detects, after confirming in the execution confirmation step that the first safety signal circuit test is complete, whether or not a safety signal circuit input signal is inputted when a safety signal circuit output signal is outputted to a second circuit or the safety signal circuit output signal being outputted to the second circuit is stopped, and performs a second safety signal circuit test using a result of this detection.

Effects of the Invention

According to the present invention, it is possible to facilitate creation of a safety signal test program by preliminarily providing a function for coordination between CPUs.

PREFERRED MODE FOR CARRYING OUT THE INVENTION

The following describes an embodiment of the present invention in detail with reference to FIGS. 1 to 4C. First, a configuration of a control device according to the embodiment of the present invention will be described.

1. Overall Configuration

Figure 1:
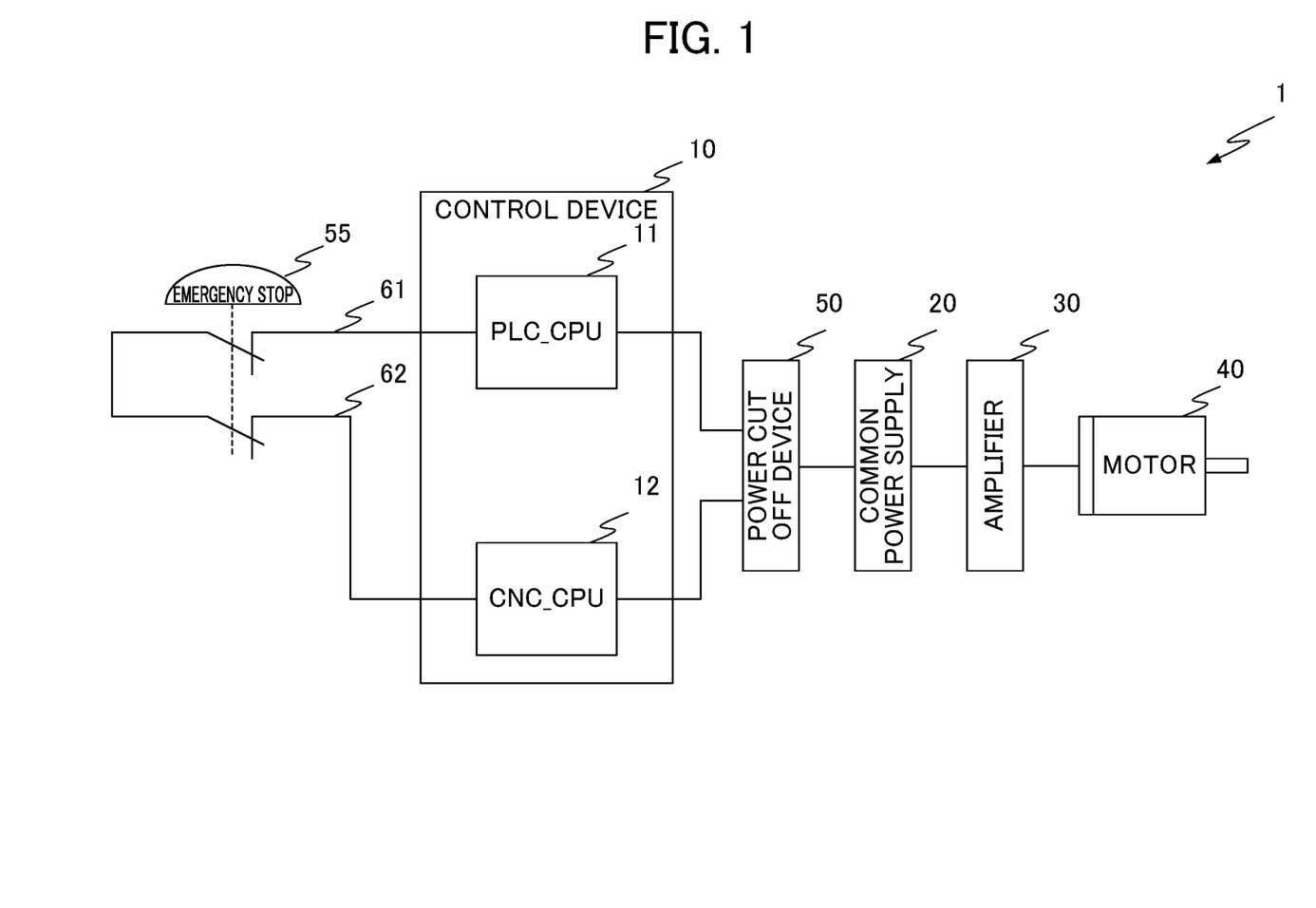
FIG. 1 is a diagram illustrating a configuration example of a control system according to one embodiment.

FIG. 1 illustrates a configuration example of a control system of a machine tool including the control device according to the present embodiment.

As shown in FIG. 1, a control system 1 includes a control device 10, a common power supply 20, an amplifier 30, a motor 40, a power cut off device 50, and an emergency stop switch 55. The control device 10 includes two controllers, a PLC_CPU 11 and a CNC_CPU 12. The PLC_CPU 11 is connected to the emergency stop switch 55 through a circuit 61, and the CNC_CPU 12 is connected to the emergency stop switch 55 through a circuit 62.

The control device 10 sends a command indicating a PWM frequency and a voltage value to the amplifier 30 based on feedback information from the motor 40 in order to control the rotation speed of the motor 40 in the machine tool. The control device 10 includes the two controllers, the PLC_CPU 11 and the CNC_CPU 12.

The PLC_CPU 11 is a controller that executes programmable logic control (PLC), which is alternative control for a relay circuit.

The CNC_CPU 12 is a controller that executes computerized numerical control (CNC), which is numerical control over the machine tool.

The common power supply 20 is a device that supplies electric power from the control device 10 to the amplifier 30.

The amplifier 30 controls the electric current of the motor 40 by converting the voltage value indicated by the command into a pulse signal using a switching element and applying the pulse signal to the motor 40.

The motor 40 rotates a spindle using the electric current supplied from the amplifier 30. The motor 40 also feeds back, for example, the rotation speed to the control device 10.

The power cut off device 50 cuts off power to the motor 40 by stopping the supply of electric power from the common power supply 20 to the amplifier 30 upon receiving an emergency stop signal generated as a result of an operator of the control system 1 operating the emergency stop switch 55 described below in an emergency or similar situation.

The emergency stop switch 55 is used by the operator of the control system 1 to send a command indicating an emergency operation stop to the machine tool, and is either in an ON state or in an OFF state. The emergency stop switch 55 is separate from the machine tool and may be included in a portable device. The emergency stop switch 55 may be a push-button emergency stop switch, a foot-operated emergency stop switch, or a rope emergency stop switch.

The emergency stop signal (emergency shutdown procedure (ESP) signal) from the emergency stop switch 55 is inputted to the power cut off device 50 after passing through the circuit 61 or the circuit 62, and then passing through the PLC_CPU 11 or the CNC_CPU 12. That is, the emergency stop signal (ESP signal) is under double monitoring by being configured to pass through the PLC_CPU 11 or the CNC_CPU 12.

However, as described above, the circuit 61 or the circuit 62 can be stuck in an always-on state or an always-off state, or a wiring short can occur between the circuit 61 and the circuit 62, resulting in a failure in detection of an abnormality of the safety input signal. For such occasions, a safety signal circuit test is performed. An overview of the safety signal circuit test is described in the next section. In the safety signal circuit test, the control device 10 tests if a specified input signal or a specified output signal is turned on and off properly.

2. Overview of Safety Signal Circuit Test

Figure 2:
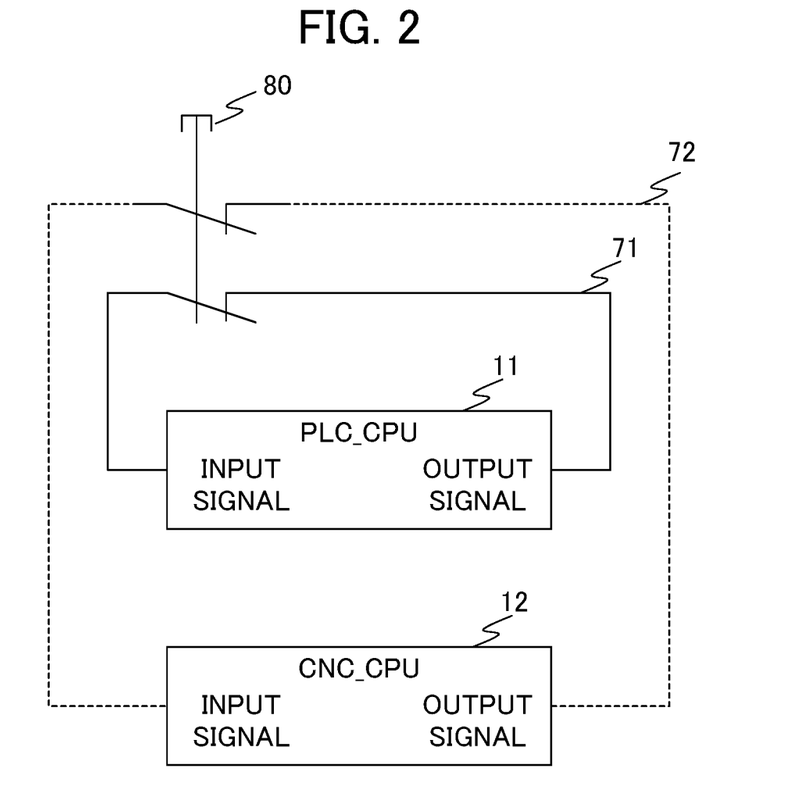
FIG. 2 is an example of a circuit diagram for performing a safety signal circuit test in a control device according to the one embodiment.

FIG. 2 illustrates an overview of a circuit diagram for performing the safety signal circuit test.

As shown in FIG. 2, a circuit 71 is installed between an output terminal for outputting an output signal from the PLC_CPU 11 and an input terminal for inputting an input signal to the PLC_CPU 11. Likewise, a circuit 72 is installed between an output terminal for outputting an output signal from the CNC_CPU 12 and an input terminal for inputting an input signal to the CNC_CPU 12. Both the circuit 71 and the circuit 72 have a path through an emergency stop switch 80.

The safety signal circuit test determines whether or not turning on or off the output signal in the PLC_CPU 11 in FIG. 2 results in a detection of the input signal being accordingly turned on or off in the PLC_CPU 11. After the test at the PLC_CPU 11 has finished, a test start signal is turned on at the CNC_CPU 12 to determine whether or not turning on or off the output signal in the CNC_CPU 12 results in a detection of the input signal being accordingly turned on or off in the CNC_CPU 12. Thus, the safety signal circuit test allows for checking of stuck signals and shorts in the circuit 71 and the circuit 72.

Note that the test using the PLC_CPU 11 and the test using the CNC_CPU 12 are not performed simultaneously but are performed independently. This is because the emergency stop switch 80 fails to function if the test using the PLC_CPU 11 and the test using the CNC_CPU 12 are performed simultaneously when an emergency stop is needed.

3. Configuration of Control Device

Figure 3:
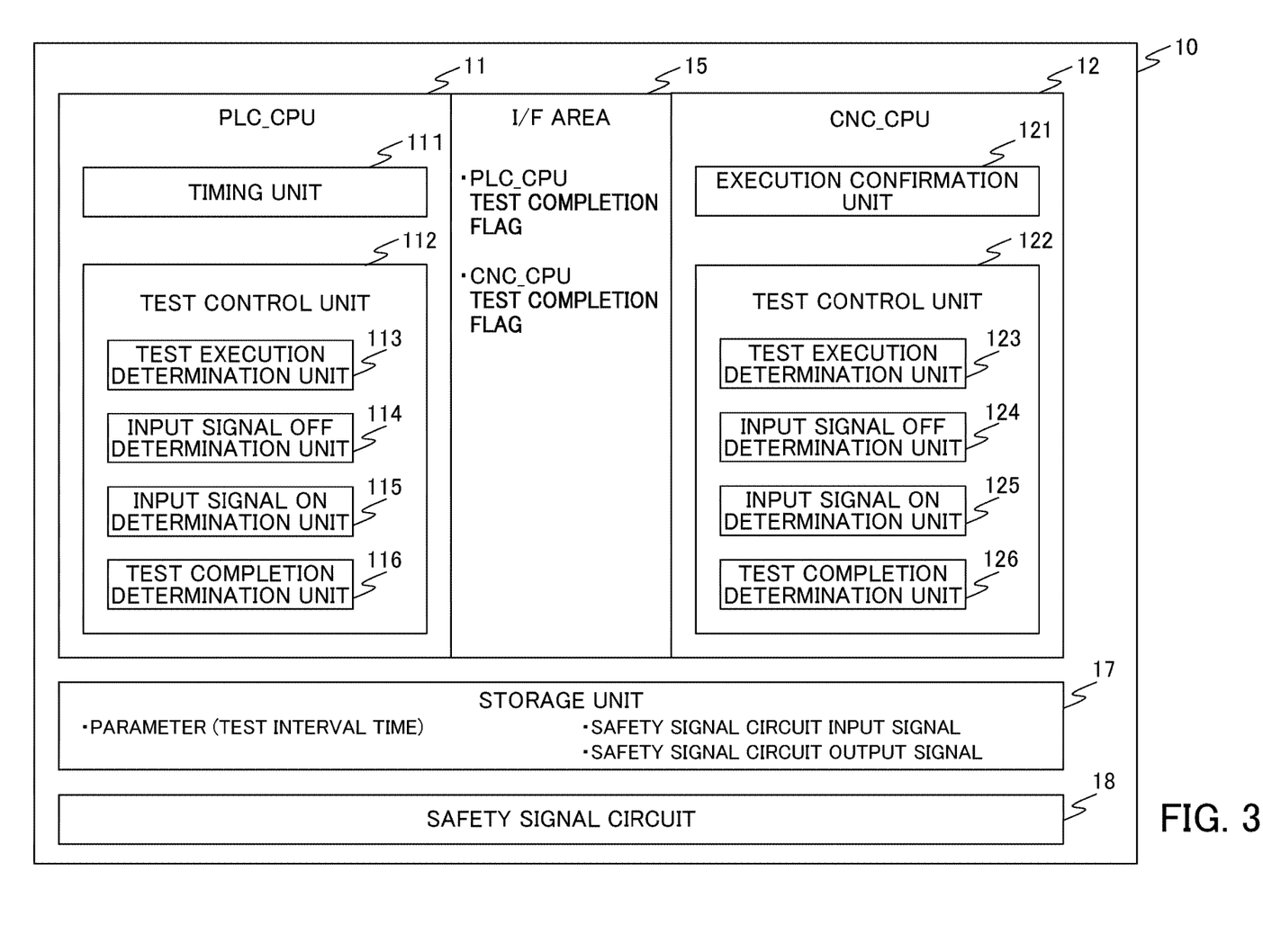
FIG. 3 is a functional block diagram illustrating the control device according to the one embodiment.

FIG. 3 is a functional block diagram illustrating a configuration of the control device 10. The control device 10 includes the PLC_CPU 11, the CNC_CPU 12, an I/F area 15, a storage unit 17, and a safety signal circuit 18. Hereinafter, the PLC_CPU 11 is also referred to as a "first controller 11", and the CNC_CPU 12 is also referred to as a "second controller 12".

The PLC_CPU 11 is a processor known to those skilled in the art, and is configured to communicate with memory such as ROM, RAM, or CMOS memory via a bus.

The PLC_CPU 11 is a processor for executing a sequence control program and performing various control and control for processing such as arithmetic processing and signal input/output processing in accordance with the sequence control program. The PLC_CPU 11 is configured to read the sequence control program stored in the ROM via the bus and perform sequence control in accordance with the sequence control program to implement functions of a timing unit 111 and a test control unit 112 shown in FIG. 3. Hereinafter, the test control unit 112 is also referred to as a "first circuit test control unit 112".

The timing unit 111 measures an elapsed time and directs a start of a first safety signal circuit test, which is performed by the PLC_CPU 11, based on the elapsed time.

More specifically, the timing unit 111 measures the time elapsed since the start of the safety signal circuit test in the control device 10 as a whole. The timing unit 111 also checks whether or not this elapsed time has exceeded a test interval time, and turns on an execution flag for the first safety signal circuit test by the test control unit 112 if the elapsed time has exceeded the test interval time. Furthermore, the timing unit 111 checks a PLC_CPU test completion flag and a CNC_CPU test completion flag stored in the I/F area 15, which are described below. If both of the flags are on, the timing unit 111 resets the elapsed time, and then turns off the PLC_CPU test completion flag and the CNC_CPU test completion flag.

The "test interval time" refers to an interval time between the start of the safety signal circuit test in the control device 10 as a whole and the start of the first safety signal circuit test by the test control unit 112.

The test control unit 112 includes a test execution determination unit 113, an input signal off determination unit 114, an input signal on determination unit 115, and a test completion determination unit 116. Hereinafter, the test execution determination unit 113, the input signal off determination unit 114, the input signal on determination unit 115, and the test completion determination unit 116 are also referred to as a "first test execution determination unit 113", a "first input signal off determination unit 114", a "first input signal on determination unit 115", and a "first test completion determination unit 116", respectively.

The test execution determination unit 113 checks an execution flag for the safety signal circuit test, and directs the input signal off determination unit 114 and the input signal on determination unit 115 to start the first safety signal circuit test if the execution flag is on.

The input signal off determination unit 114 checks whether or not a safety signal circuit input signal in an input signal area of a first circuit, which for example is the circuit 71 in FIG. 2, connected to the PLC_CPU 11 is turned off when a safety signal circuit output signal in an output signal area of the first circuit is turned off. More specifically, the input signal off determination unit 114 determines that the first circuit is normal if the safety signal circuit input signal is turned off, and determines that the first circuit has an abnormality if the safety signal circuit input signal is on.

The input signal on determination unit 115 checks whether or not the safety signal circuit input signal in the input signal area of the first circuit, which for example is the circuit 71 in FIG. 2, connected to the PLC_CPU 11 is turned on when the safety signal circuit output signal in the output signal area of the first circuit is turned on. More specifically, the input signal on determination unit 115 determines that the first circuit is normal if the safety signal circuit input signal is turned on, and determines that the first circuit has an abnormality if the safety signal circuit input signal is off.

The test completion determination unit 116 determines whether or not both the determination by the input signal off determination unit 114 and the determination by the input signal on determination unit 115 are complete. More specifically, the test completion determination unit 116 checks whether or not both the determination by the input signal off determination unit 114 and the determination by the input signal on determination unit 115 are complete, and turns on the PLC_CPU test completion flag stored in the I/F area 15 and turns off the execution flag for the safety signal circuit test if both the determinations are complete.

The CNC_CPU 12 is a processor known to those skilled in the art, and is configured to communicate with memory such as ROM, RAM, or CMOS memory via a bus.

The CNC_CPU 12 is a processor for performing numerical control over operation of the machine tool, not shown, as numerical control known to those skilled in the art. The CNC_CPU 12 is configured to read a control program out of an auxiliary storage device, not shown, such as read only memory (ROM) or a hard disk drive (HDD) storing various control programs. The CNC_CPU 12 is also configured to implement functions of an execution confirmation unit 121 and a test control unit 122 shown in FIG. 3 by executing the control program using data stored in a main storage device such as RAM for storing data temporarily needed in executing the control program. Hereinafter, the test control unit 122 is also referred to as a "second circuit test control unit 122".

The execution confirmation unit 121 confirms whether or not the first safety circuit test by the test control unit 112 is complete.

More specifically, the execution confirmation unit 121 checks the PLC_CPU test completion flag stored in the I/F area 15, and turns on the execution flag for the safety signal circuit test if the PLC_CPU test completion flag is on.

The test control unit 122 includes a test execution determination unit 123, an input signal off determination unit 124, an input signal on determination unit 125, and a test completion determination unit 126. Hereinafter, the test execution determination unit 123, the input signal off determination unit 124, the input signal on determination unit 125, and the test completion determination unit 126 are also referred to as a "second test execution determination unit 123", a "second input signal off determination unit 124", a "second input signal on determination unit 125", and a "second test completion determination unit 126", respectively.

The test execution determination unit 123 checks the execution flag for the safety signal circuit test, and directs the input signal off determination unit 124 and the input signal on determination unit 125 to start the second safety signal circuit test if the execution flag is on.

The input signal off determination unit 124 checks whether or not a safety signal circuit input signal in an input signal area of a second circuit, which for example is the circuit 72 in FIG. 2, connected to the CNC_CPU 12 is turned off when a safety signal circuit output signal in an output signal area of the second circuit is turned off. More specifically, the input signal off determination unit 124 determines that the second circuit is normal if the safety signal circuit input signal is turned off, and determines that the second circuit has an abnormality if the safety signal circuit input signal is on.

The input signal on determination unit 125 checks whether or not the safety signal circuit input signal in the input signal area of the second circuit, which for example is the circuit 72 in FIG. 2, connected to the CNC_CPU 12 is turned on when the safety signal circuit output signal in the output signal area of the second circuit is turned on. More specifically, the input signal on determination unit 125 determines that the second circuit is normal if the safety signal circuit input signal is turned on, and determines that the second circuit has an abnormality if the safety signal circuit input signal is off.

The test completion determination unit 126 determines whether or not both the determination by the input signal off determination unit 124 and the determination by the input signal on determination unit 125 are complete. More specifically, the test completion determination unit 126 checks whether or not both the determination by the input signal off determination unit 124 and the determination by the input signal on determination unit 125 are complete, and turns on the CNC_CPU test completion flag stored in the I/F area 15 and turns off the execution flag for the safety signal circuit test if both the determinations are complete.

The I/F area 15 is an interface area between the PLC_CPU 11 and the CNC_CPU 12. The PLC_CPU test completion flag and the CNC_CPU test completion flag are stored in the I/F area 15.

The PLC_CPU test completion flag is related to the completion of the first safety signal circuit test by the PLC_CPU 11. The PLC_CPU test completion flag indicates that the first safety signal circuit test is complete when, for example, the PLC_CPU test completion flag is on. However, the PLC_CPU test completion flag is not limited as such, and may indicate that the first safety signal circuit test is complete when the PLC_CPU test completion flag is off.

The CNC_CPU test completion flag is related to the completion of the second safety signal circuit test by the CNC_CPU 12. The CNC_CPU test completion flag indicates that the second safety signal circuit test is complete when, for example, the CNC_CPU test completion flag is on. However, the CNC_CPU test completion flag is not limited as such, and may indicate that the second safety signal circuit test is complete when the CNC_CPU test completion flag is off.

The storage unit 17 stores therein the test interval time as a parameter. The storage unit 17 also stores therein the safety signal circuit input signal and the safety signal circuit output signal. Furthermore, the storage unit 17 may include an auxiliary storage device such as a hard disk drive (HDD) storing various control programs and a main storage device such as random access memory (RAM) for storing data temporarily needed in executing the programs.

The safety signal circuit 18 includes a logic gate that cuts off a motor drive signal for driving the motor included in the machine tool (not shown) based on the safety signal circuit input signal.

In the case of the control device 10 as described above, unlike the conventional technology, the user of the control device 10 does not need to create a safety signal circuit test program and only needs to externally set a parameter stored in the storage unit 17. Thus, the control device 10 eliminates the need to access I/O signal areas (not shown) of the PLC_CPU 11 and the CNC_CPU 12, the need to turn on input signals stored in the I/O signal areas, and the need to check output signals in the I/O signal areas. As a result, the possibility of faultily creating the safety signal circuit test program is prevented, and the number of steps in program creation is reduced.

4. Operation of Control Device

Figure 4A:
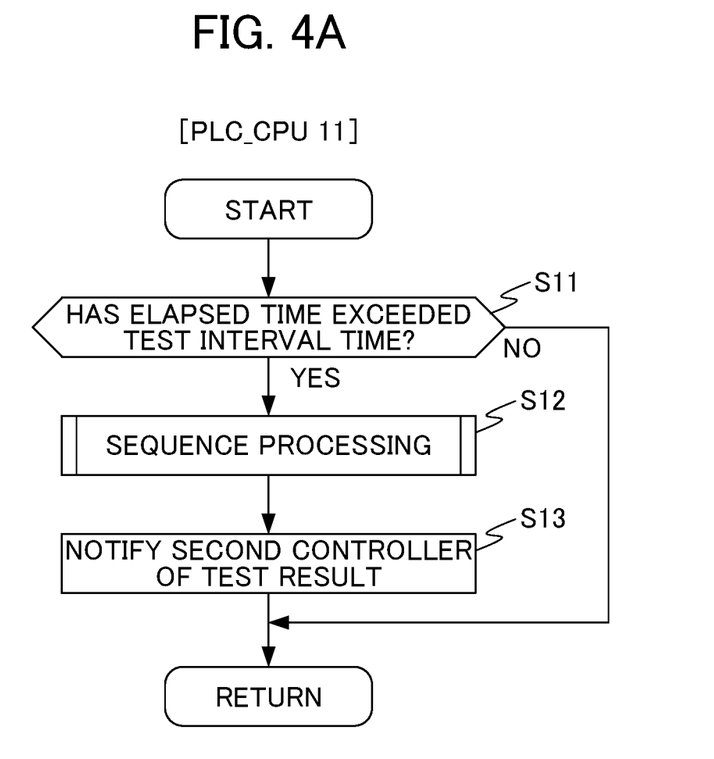
FIG. 4A is a flowchart showing operation of the control device according to the one embodiment.
Figure 4B:
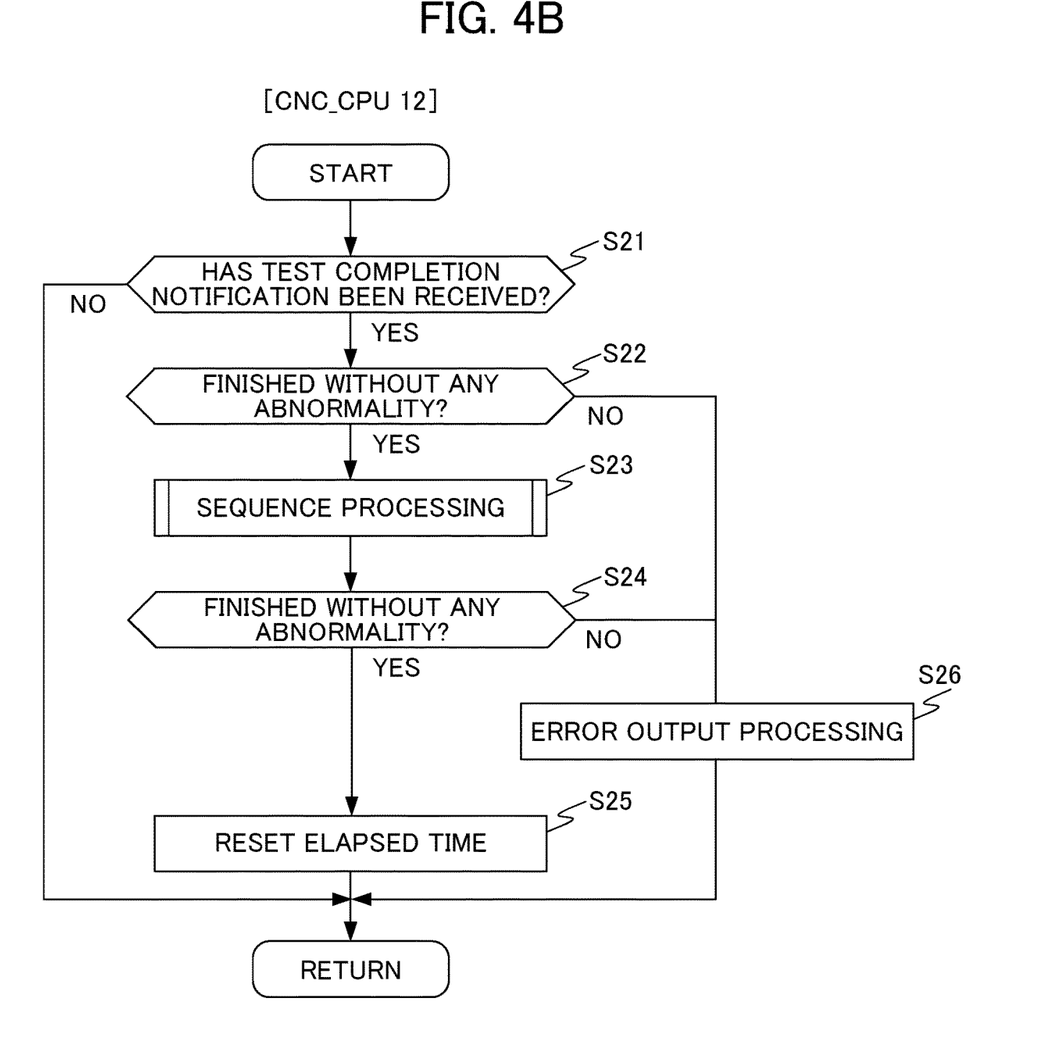
FIG. 4B is a flowchart showing operation of the control device according to the one embodiment.
Figure 4C:
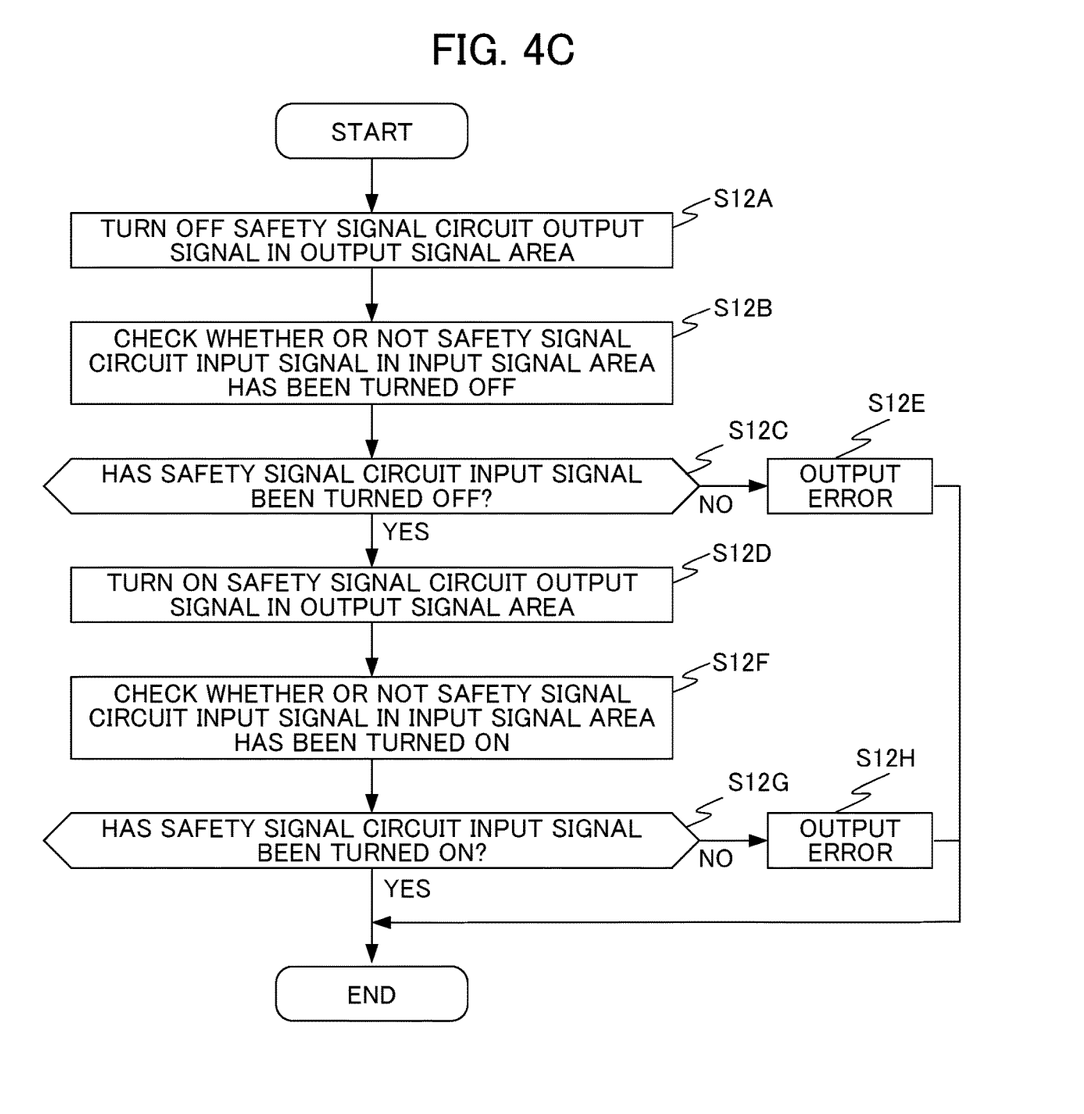
FIG. 4C is a flowchart showing operation of the control device according to the one embodiment.

FIGS. 4A to 4C are flowcharts showing operation of the control device 10. More specifically, FIG. 4A is a flowchart showing operation of the PLC_CPU 11. FIG. 4B is a flowchart showing operation of the CNC_CPU 12. FIG. 4C is a flowchart showing sub-steps included in sequence processing in Step S12 in the flowchart shown in FIG. 4A and sub-steps included in sequence processing in Step S23 in the flowchart shown in FIG. 4B.

Referring to FIG. 4A, if the elapsed time has exceeded the test interval time in the PLC_CPU 11 in Step S11 (YES in S11), the operation continues to Step S12. If the elapsed time has not exceeded the test interval time in the PLC_CPU 11 (NO in S11), the operation continues (returns) to Step S11.

In Step S12, the PLC_CPU 11 executes the sequence processing. Step S12 includes eight sub-steps Step S12A to S12H shown in FIG. 4C.

In Step S12A, the input signal off determination unit 114 turns off the safety signal circuit output signal in the output signal area.

In Step S12B, the input signal off determination unit 114 checks whether or not the safety signal circuit input signal in the input signal area has been turned off.

If the safety signal circuit input signal is determined in Step S12C to have been turned off (YES in S12C), the operation continues to Step S12D. If the safety signal circuit input signal is not determined to have been turned off (NO in S12C), the operation continues to Step S12E.

In Step S12D, the input signal on determination unit 115 turns on the safety signal circuit output signal in the output signal area.

In Step S12E, the input signal off determination unit 114 outputs an error. Thereafter, the processing in Step S12 as a whole ends.

In Step S12F, the input signal on determination unit 115 checks whether or not the safety signal circuit input signal in the input signal area has been turned on.

If the safety signal circuit input signal is determined in Step S12G to have been turned on (YES in S12G), the processing in Step S12 as a whole ends. If the safety signal circuit input signal is not determined to have been turned on (NO in S12G), the operation continues to Step S12H.

In Step S12H, the input signal on determination unit 115 outputs an error. Thereafter, the processing in Step S12 as a whole ends.

Returning to FIG. 4A, in Step S13, the PLC_CPU 11 notifies the CNC_CPU 12 of the test result obtained in Step S12. Thereafter, the operation continues (retunes) to Step S11.

Referring to FIG. 4B, if the CNC_CPU 12 has received a test completion notification from the PLC_CPU 11 in Step S21 (YES in S21), the operation continues to Step S22. If the CNC_CPU 12 has not received a test completion notification from the PLC_CPU 11 (NO in S21), the operation continues (returns) to Step S21.

If the test completion notification indicates in Step S22 that the first safety signal circuit test in the PLC_CPU 11 has finished without any abnormality (YES in S22), the operation continues to Step S23. If the test completion notification indicates that an abnormality has been found in the first safety signal circuit test (NO in S22), the operation continues to Step S26.

In Step S23, the CNC_CPU 12 executes the sequence processing. Step S23 includes the same sub-steps as Step S12 except that the "input signal off determination unit 114" and the "input signal on determination unit 115" are respectively replaced by the "input signal off determination unit 124" and the "input signal on determination unit 125" in the eight sub-steps Steps S12A to S12H shown in FIG. 4C. The description of Step S23 will therefore be omitted.

Returning to FIG. 4B, if the sequence processing in Step S23 is determined in Step S24 to have finished without any abnormality (YES in S24), the operation continues to Step S25. If an abnormality has been found in the sequence processing in Step S23 (NO in S24), the operation continues to Step S26.

In Step S25, the CNC_CPU 12 resets the elapsed time. Thereafter, the operation continues (returns) to Step S21.

In Step S26, the CNC_CPU 12 outputs the abnormality (error) indicated in Step S22 and Step S24. Thereafter, the operation continues (returns) to Step S21.

5. Effects Produced by Present Embodiment (1) A control device (for example, the "control device 10" described above) according to the present embodiment is a control device for performing a test of a safety signal circuit (for example, the "safety signal circuit 18" described above) that cuts off, based on an input signal, a motor drive signal for driving a motor included in a machine tool. The control device includes: the safety signal circuit; a first controller (for example, the "PLC_CPU 11" described above); and a second controller (for example, the "CNC_CPU 12" described above). The first controller includes: a timing unit (for example, the "timing unit 111" described above) configured to measure an elapsed time and direct a start of a first safety signal circuit test based on the elapsed time; and a first circuit test control unit (for example, the "test control unit 112" described above) configured to detect whether or not a safety signal circuit input signal is inputted when a safety signal circuit output signal is outputted to a first circuit or the safety signal circuit output signal being outputted to the first circuit is stopped, and perform the first safety signal circuit test using a result of this detection. The second controller includes: an execution confirmation unit (for example, the "execution confirmation unit 121" described above) configured to confirm whether or not the first safety signal circuit test by the first test control unit is complete; and a second circuit test control unit (for example, the "test control unit 122" described above) configured to detect, after the execution confirmation unit has confirmed that the first safety signal circuit test is complete, whether or not a safety signal circuit input signal is inputted when a safety signal circuit output signal is outputted to a second circuit or the safety signal circuit output signal being outputted to the second circuit is stopped, and perform a second safety signal circuit test using a result of this detection.

This configuration makes it possible to facilitate creation of a safety signal test program by preliminarily providing a function for coordination between CPUs. As a result, the possibility of faultily creating the test program is prevented, and the number of steps in test program creation is reduced.

(2) In the control device described in (1), the first circuit test control unit may include: a first test execution determination unit (for example, the "test execution determination unit 113" described above) configured to determine whether or not the start of the first safety signal circuit test is permitted; a first input signal off determination unit (for example, the "input signal off determination unit 114" described above) configured to determine whether or not the safety signal circuit input signal is inputted to an input signal area of the first circuit when the safety signal circuit output signal being outputted to an output signal area of the first circuit is stopped; a first input signal on determination unit (for example, the "input signal on determination unit 115" described above) configured to determine whether or not the safety signal circuit input signal is inputted to the input signal area of the first circuit when the safety signal circuit output signal is outputted to the output signal area of the first circuit; and a first test completion determination unit (for example, the "test completion determination unit 116" described above) configured to determine whether or not both the determination by the first input signal off determination unit and the determination by the first input signal on determination unit are complete. The second circuit test control unit may include: a second test execution determination unit (for example, the "test execution determination unit 123" described above) configured to determine whether or not a start of the second safety signal circuit test is permitted; a second input signal off determination unit (for example, the "input signal off determination unit 124" described above) configured to determine whether or not the safety signal circuit input signal is inputted to an input signal area of the second circuit when the safety signal circuit output signal being outputted to an output signal area of the second circuit is stopped; a second input signal on determination unit (for example, the "input signal on determination unit 125" described above) configured to determine whether or not the safety signal circuit input signal is inputted to the input signal area of the second circuit when the safety signal circuit output signal is outputted to the output signal area of the second circuit; and a second test completion determination unit (for example, the "test completion determination unit 126" described above) configured to determine whether or not both the determination by the second input signal off determination unit and the determination by the second input signal on determination unit are complete.

This configuration makes it possible to confirm, without creating a test program, the presence of an abnormality due to, for example, a stuck signal or a short in the first circuit and the second circuit. In particular, the user of the control device 10 does not need to create a safety signal circuit test program and only needs to externally set a parameter stored in the storage unit 17. Thus, the control device 10 eliminates the need to access the I/O signal areas (not shown) of the PLC_CPU 11 and the CNC_CPU 12, the need to turn on input signals stored in the I/O signal areas, and the need to check output signals in the I/O signal areas.

(3) A control method according to the present embodiment is a control method for performing, in a control device, a test of a safety signal circuit (for example, the "safety signal circuit 18" described above) that cuts off, based on an input signal, a motor drive signal for driving a motor included in a machine tool. The control device includes: the safety signal circuit; a first controller (for example, the "PLC_CPU 11" described above); and a second controller (for example, the "CNC_CPU 12" described above). The control method may include: a timing step in which the first controller measures an elapsed time and directs a start of a first safety signal circuit test based on the elapsed time; a first circuit test control step in which the first controller detects whether or not a safety signal circuit input signal is inputted when a safety signal circuit output signal is outputted to a first circuit or the safety signal circuit output signal being outputted to the first circuit is stopped, and performs the first safety signal circuit test using a result of this detection; an execution confirmation step in which the second controller confirms whether or not the first safety signal circuit test in the first circuit test control step is complete; and a second circuit test control step in which the second controller detects, after confirming in the execution confirmation step that the first safety signal circuit test is complete, whether or not a safety signal circuit input signal is inputted when a safety signal circuit output signal is outputted to a second circuit or the safety signal circuit output signal being outputted to the second circuit is stopped, and performs a second safety signal circuit test using a result of this detection.

This configuration makes it is possible to facilitate creation of a safety signal test program by preliminarily providing a function for coordination between CPUs. As a result, the possibility of faultily creating the test program is prevented, and the number of steps in test program creation is reduced.

(4) In the control method described in (3), the first circuit test control step may include: a first test execution determination sub-step in which the first controller determines whether or not the start of the first safety signal circuit test is permitted; a first input signal off determination sub-step in which the first controller determines whether or not the safety signal circuit input signal is inputted to an input signal area of the first circuit when the safety signal circuit output signal being outputted to an output signal area of the first circuit is stopped; a first input signal on determination sub-step in which the first controller determines whether or not the safety signal circuit input signal is inputted to the input signal area of the first circuit when the safety signal circuit output signal is outputted to the output signal area of the first circuit; and a first test completion determination sub-step in which the first controller determines whether or not both the determination in the first input signal off determination sub-step and the determination in the first input signal on determination sub-step are complete. The second circuit test control step includes: a second test execution determination sub-step in which the second controller determines whether or not a start of the second safety signal circuit test is permitted; a second input signal off determination sub-step in which the second controller determines whether or not the safety signal circuit input signal is inputted to an input signal area of the second circuit when the safety signal circuit output signal being outputted to an output signal area of the second circuit is stopped; a second input signal on determination sub-step in which the second controller determines whether or not the safety signal circuit input signal is inputted to the input signal area of the second circuit when the safety signal circuit output signal is outputted to the output signal area of the second circuit; and a second test completion determination sub-step in which the second controller determines whether or not both the determination in the second input signal off determination sub-step and the determination in the second input signal on determination sub-step are complete.

This configuration makes it possible to confirm, without creating a test program, the presence of an abnormality due to, for example, a stuck signal or a short in the first circuit and the second circuit. In particular, the user of the control device 10 does not need to create a safety signal circuit test program and only needs to externally set a parameter stored in the storage unit 17. Thus, the control device 10 eliminates the need to access the I/O signal areas (not shown) of the PLC_CPU 11 and the CNC_CPU 12, the need to turn on input signals stored in the I/O signal areas, and the need to check output signals in the I/O signal areas.

The control method adopted by the control device 10 is implemented by software. In the case where the control method is implemented by software, programs that constitute the software are installed on a computer (control device 10). These programs may be distributed to users by being recorded on removable media or may be distributed by being downloaded onto users' computers via a network. Furthermore, these programs may be provided to a user's computer (control device 10) as a web service over a network without being downloaded.

EXPLANATION OF REFERENCE NUMERALS

1: Control system
10: Control device
11: PLC_CPU (first controller)
12: CNC_CPU (second controller)
15: I/F area
17: Storage unit
111: Timing unit
112, 122: Test control unit
113, 123: Test execution determination unit
114, 124: Input signal off determination unit
115, 125: Input signal on determination unit
116, 126: Test completion determination unit

The invention claimed is:

1. A control device for performing a test of a safety signal circuit that cuts off, based on an input signal from an emergency stop switch, a motor drive signal for driving a motor included in a machine tool, the control device comprising:

the safety signal circuit;
a first controller having a first output terminal and a first input terminal; and
a second controller having a second output terminal and a second input terminal,
the first controller including:
a timing unit configured to measure an elapsed time and direct a start of a first safety signal circuit test based on the elapsed time; and
a first circuit test control unit configured to perform a first detection of whether or not a safety signal circuit input signal is inputted from the first input terminal when a safety signal circuit output signal is outputted from the first output terminal to a first circuit installed between the first output terminal and the first input terminal or the safety signal circuit output signal being outputted from the first output terminal to the first circuit is stopped, and perform the first safety signal circuit test using a result of the first detection,
the second controller including:
an execution confirmation unit configured to confirm whether or not the first safety signal circuit test by the first test control unit is complete; and
a second circuit test control unit configured to perform a second detection of, after the execution confirmation unit has confirmed that the first safety signal circuit test is complete, whether or not a safety signal circuit input signal is inputted from the second input terminal when a safety signal circuit output signal is outputted from the second output terminal to a second circuit installed between the second output terminal and the second input terminal or the safety signal circuit output signal being outputted from the second output terminal to the second circuit is stopped, and perform a second safety signal circuit test using a result of the second detection, wherein
both the first circuit and the second circuit have a path through the emergency stop switch.

2. The control device according to claim 1, wherein the first circuit test control unit includes:
a first test execution determination unit configured to determine whether or not the start of the first safety signal circuit test is directed by the timing unit;
a first input signal off determination unit configured to determine whether or not the safety signal circuit input signal is inputted to an input signal area of the first circuit when the safety signal circuit output signal being outputted to an output signal area of the first circuit is stopped;
a first input signal on determination unit configured to determine whether or not the safety signal circuit input signal is inputted to the input signal area of the first circuit when the safety signal circuit output signal is outputted to the output signal area of the first circuit; and
a first test completion determination unit configured to determine whether or not both the determination by the first input signal off determination unit and the determination by the first input signal on determination unit are complete, and
the second circuit test control unit includes:

a second test execution determination unit configured to determine whether or not the completion of the first safety signal circuit test is confirmed by the execution confirmation unit;

a second input signal off determination unit configured to determine whether or not the safety signal circuit input signal is inputted to an input signal area of the second circuit when the safety signal circuit output signal being outputted to an output signal area of the second circuit is stopped;

a second input signal on determination unit configured to determine whether or not the safety signal circuit input signal is inputted to the input signal area of the second circuit when the safety signal circuit output signal is outputted to the output signal area of the second circuit; and a second test completion determination unit configured to determine whether or not both the determination by the second input signal off determination unit and the determination by the second input signal on determination unit are complete.

3. A control method for performing, in a control device, a test of a safety signal circuit that cuts off, based on an input signal from an emergency stop switch, a motor drive signal for driving a motor included in a machine tool, the control device including:

the safety signal circuit;

a first controller having a first output terminal and a first input terminal; and a second controller having a second output terminal and a second input terminal, the control method comprising:

a timing step in which the first controller measures an elapsed time and directs a start of a first safety signal circuit test based on the elapsed time;

a first circuit test control step in which the first controller performs a first detection of whether or not a safety signal circuit input signal is inputted from the first input terminal when a safety signal circuit output signal is outputted from the first output terminal to a first circuit installed between the first output terminal and the first input terminal or the safety signal circuit output signal being outputted from the first output terminal to the first circuit is stopped, and performs the first safety signal circuit test using a result of the first detection;

an execution confirmation step in which the second controller confirms whether or not the first safety signal circuit test in the first circuit test control step is complete; and a second circuit test control step in which the second controller performs a second detection of, after confirming in the execution confirmation step that the first safety signal circuit test is complete, whether or not a safety signal circuit input signal is inputted from the second input terminal when a safety signal circuit output signal is outputted from the second output terminal to a second circuit installed between the second output terminal and the second input terminal or the safety signal circuit output signal being outputted from the second output terminal to the second circuit is stopped, and performs a second safety signal circuit test using a result of the second detection, wherein both the first circuit and the second circuit have a path through the emergency stop switch.

4. The control method according to claim 3, wherein the first circuit test control step includes:

a first test execution determination sub-step in which the first controller determines whether or not the start of the first safety signal circuit test is directed in the timing step;

a first input signal off determination sub-step in which the first controller determines whether or not the safety signal circuit input signal is inputted to an input signal area of the first circuit when the safety signal circuit output signal being outputted to an output signal area of the first circuit is stopped;

a first input signal on determination sub-step in which the first controller determines whether or not the safety signal circuit input signal is inputted to the input signal area of the first circuit when the safety signal circuit output signal is outputted to the output signal area of the first circuit; and a first test completion determination sub-step in which the first controller determines whether or not both the determination in the first input signal off determination sub-step and the determination in the first input signal on determination sub-step are complete, and the second circuit test control step includes:

a second test execution determination sub-step in which the second controller determines whether or not the completion of the first safety signal circuit test is confirmed in the execution confirmation step;

a second input signal off determination sub-step in which the second controller determines whether or not the safety signal circuit input signal is inputted to an input signal area of the second circuit when the safety signal circuit output signal being outputted to an output signal area of the second circuit is stopped;

a second input signal on determination sub-step in which the second controller determines whether or not the safety signal circuit input signal is inputted to the input signal area of the second circuit when the safety signal circuit output signal is outputted to the output signal area of the second circuit; and a second test completion determination sub-step in which the second controller determines whether or not both the determination in the second input signal off determination sub-step and the determination in the second input signal on determination sub-step are complete.

* * * * *